United States Patent [19]

Ismert

[11] Patent Number: 4,819,698
[45] Date of Patent: Apr. 11, 1989

[54] WATER HAMMER ARRESTER

[75] Inventor: Joseph P. Ismert, Peculiar, Mo.

[73] Assignee: Sioux Chief Manufacturing Company, Inc., Peculiar, Mo.

[21] Appl. No.: 113,631

[22] Filed: Oct. 26, 1987

[51] Int. Cl.[4] .............................................. F16L 55/04
[52] U.S. Cl. .......................................... 138/31; 138/26
[58] Field of Search .............................. 138/26, 30, 31

[56] References Cited

U.S. PATENT DOCUMENTS

| | | | |
|---|---|---|---|
| Re. 24,223 | 9/1956 | Ford et al. .............................. | 138/31 |
| 445,917 | 2/1891 | Worthington ..................... | 138/31 X |
| 1,116,414 | 11/1914 | Gould .................................... | 138/31 |
| 2,406,197 | 8/1946 | Christensen ........................... | 138/31 |
| 2,707,002 | 4/1955 | Harris .................................... | 138/31 |
| 2,873,763 | 2/1959 | Mercier ................................. | 138/31 |
| 3,136,340 | 6/1964 | Wildi et al. ........................... | 138/31 |
| 3,158,180 | 11/1964 | Greer .................................... | 138/31 |
| 3,633,627 | 1/1972 | Perrott et al. ......................... | 138/31 |
| 3,863,677 | 2/1975 | Tarsha .................................. | 138/31 |
| 4,077,100 | 3/1978 | Zahid ................................ | 138/30 X |

*Primary Examiner*—James E. Bryant, III
*Attorney, Agent, or Firm*—Wm. Bruce Day

[57] ABSTRACT

A seamless water hammer arrester is formed of an elongate chamber with an entirely seamless upper closed end and a lower end connectable to a water pipe. A piston is emplaced in the chamber and is movable up and down therein to dampen water hammer. The piston defines an upper chamber portion in the chamber which has a super atmospheric charge of gas providing a downward pressure on the piston. The piston is of a liquid and gas impervious, lightweight synthetic material and has at least three O-ring seals therearound to maintain a substantially leak free separation of the upper and lower chamber portions. The piston is preferably domed to accord to the shape of the chamber upper end and hollow to collect sediment when used in a upside down orientation.

1 Claim, 1 Drawing Sheet

WATER HAMMER ARRESTER

FIELD OF THE INVENTION

The present invention relates to water hammer arresters, and more particularly, to a water hammer arrester containing an internal piston sealing an air chamber.

BACKGROUND OF THE INVENTION

The term "water hammer" is well known to engineers, contractors, maintenance personnel and other persons engaged in the plumbing and piping industry. The destructive forces and hammer blow sounds associated with "water hammer" have caused annoyance, inconvenience and costly damage in piping systems. Water hammer is the term used to define the destructive forces, pounding noises and vibration which develop in a piping system when a column of non-compressible liquid flowing through a pipe line at a given pressure and velocity is stopped abruptly. The tremendous forces generated at the point of impact or stoppage can be compared, in effect, to that of an explosion.

When water hammer occurs, a high intensity pressure wave travels back through the piping system until it reaches a poit of some relief such as a large diameter riser or piping main. The shock wave will then surge back and forth between the point of relief and the point of impact until the destructive energy is dissipated in the piping system. This violent action accounts for the piping noise and vibration. The common cause of shock is the quick closing of electrical, pneumatic, or spring loaded valves or devices as well as the quick hand closure of valves or fixtures. The speed of the valve closure time, especially during the last fifteen percent of valve closure, is directly related to the intensity of the surge of pressure.

The water hammer shock wave travels back and forth in the piping between the point of quick closure and the point of relief at a rate of 4,000 to 4,500 feet per second. The shock wave alternately expands and contracts the piping during its travel and may cause any of the following conditions: ruptured piping, leaking connections, weakened connections, pipe vibration and noise, damaged valves, damaged water meters, loosened pipe hangers and supports, ruptured tanks and water heaters, and premature failure of other equipment and devices.

Water hammer arresters are designed to employ a cushion of gas or air to absorb and control water hammer and substantially act as a shock absorber to lessen the effect of the water hammer. Various water hammer arresters have been known in the art, including those which are chambers with fittings at the top through which a charge of compressed air can be admitted into the chamber. However, unless the charge of air or gas is kept separate from the water, the air or gas will gradually diffuse into the water and the charge will be lost. Therefore, water hammer arresters often employ pistons with various seals therearound as a separation means. Normally, brass is used as a piston material and this, and other common materials tend to corrode after long emplacement in the piping system and the seals or pistons tend to leak, enabling the gas charge to escape. Additionally, the water may contain fine amounts of sand or calcium carbonate; i.e. hard water, which may precipitate from solution and cause mechanical abrasion of the seals and eventual leakage.

SUMMARY OF THE INVENTION

The present invention provides an improved water hammer arrester which includes a seamless elongate chamber having an upper closed end and a lower end including a means for connection to a water pipe. A piston is emplaced in the chamber and is moveable up and down therein in response to water pressure. The piston is preferably of a water and gas impervious material such as DuPont Delrin and has at least three O-rings placed therearound in grooves to provide back up sealing surfaces for maintaining a substantially leak free separation of upper and lower chamber portions within the arrester. The upper end of the arrester is preferably spun closed in a seamless design and a change of gas is emplaced within the upper chamber portion during the spinning process, resulting in no seams, valves or other top end fittings that may leak upon corrosion or after extending usage. The piston is preferably domed and has a hollow interior to collect sediments.

OBJECTS OF THE INVENTION

The principal objects of the present invention are: to provide an improved water hammer arrester; to provide a water hammer arrester including a seamless elongate chamber having an upper end which is spun closed and contains a super atmospheric charge of air or gas; to provide such a water hammer arrester having a lightweight piston emplaced therein which is manufactured of a water and gas impervious synthetic resinous material; to provide such a water hammer arrester having a plurality of seal O-rings mounted about the piston to maintain a substantially leak free separation of upper and lower chamber portions; and to provide such a water hammer arrester which is economical to manufacture, efficient and durable in operation, and which is particularly well adapted for its intended purpose.

Other objects and advantages of this invention will become apparent from the following description taken in connection with the accompanying drawings wherein are set forth, by way of illustration and example, certain embodiments of this invention.

DETAILED DESCRIPTION OF THE PREFERRED EMBODIMENT

Figure 1:
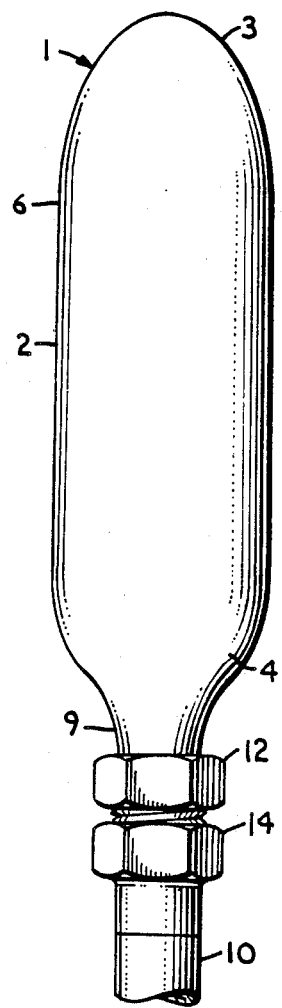
FIG. 1 is an elevational view of a water hammer arrester according to the present invention.
Figure 2:
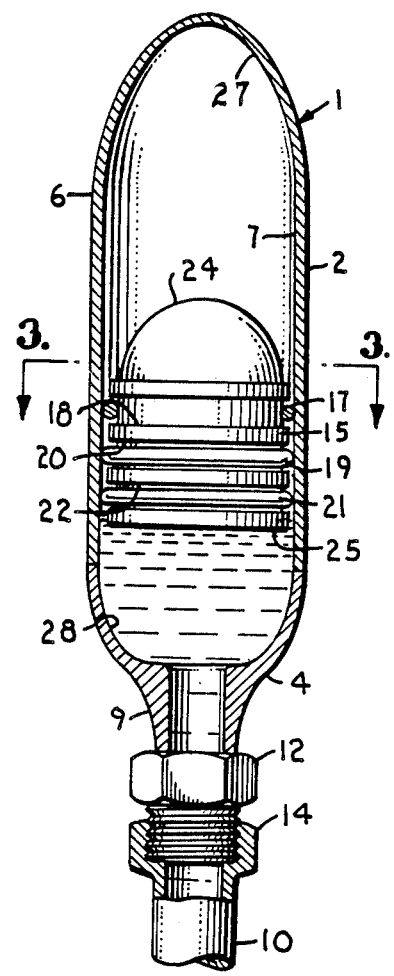
FIG. 2 is a fragmentary elevational view of a water hammer arrester showing internal details.
Figure 3:
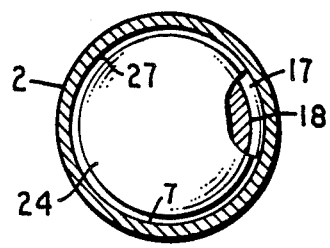
FIG. 3 is a transverse sectional view taken along lines 3—3, FIG. 2.
Figure 4:
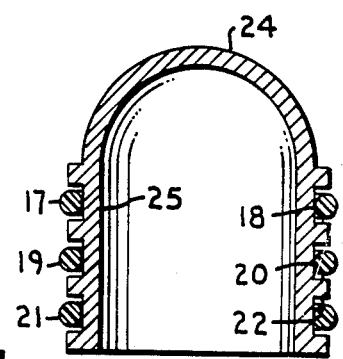
FIG. 4 is a sectional view of a piston emplaced in the water hammer arrester.

As required, a detailed embodiment of the present invention is disclosed herein, however, it is to be understood that the disclosed embodiment is merely exemplary of the invention which may be embodied in various forms. Therefore, specific structural and functional details disclosed herein are not interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a water hammer arrester according to the present invention and comprising an elongate chamber 2 having a seamless upper closed end 3 and a lower end 4. In the illustrated example, the chamber 2 is substantially in the form of an elongate, seamless cylinder having an external cylindrical wall 6 and an internal cylindrical wall 7 which is of a smooth surface for efficient sealing and passage of a piston, described below, located within the chamber 2.

The upper end 3 of the chamber 2 tapers to a conical tip and is formed by a spinning operation in which the chamber 2 is placed within a high pressure chamber containing a mandrel and spun with the then open upper end of the chamber coming into engagement with a cone shaped receiving die. Spinning is done at a relatively high RPM and the friction of forcing the upper end 3 into the receiving die heats the material of the chamber, preferably a copper alloy commonly used in plumbing, to such extent that the material begins to flow and forms a seamless, passage free and gas impervious wall.

The upper end 3 of the chamber 2 is characterized by a lack of fittings, end caps, or through passages to the external atmosphere which may form avenues for escape of a gas or air charge within the chamber 2. Moreover, these seams constitute weak places for corrosion to occur and the resulting of eventual leakage.

The chamber lower end 4 is also formed by a seamless spinning process, resulting in a neck 9 including a means for connection to a water pipe 10 forming a part of a water distribution system in which water hammering may occur. Preferably, a fitting 12, such as a threaded end, is affixed to the neck 9, as by soldering, for connection to a nut 14 on the end of the water pipe 10.

The chamber 2 contains an internal piston 15 made from a synthetic resinous material, preferably Dupont Delrin PL brand low water absorption material specifically adapted for the plumbing trade. The piston 15 is of sufficient thickness to accommodate a plurality of O-rings and preferably has at least three O-rings, including an upper O-ring 17 fitted into an upper piston groove 18, a middle O-ring 19 fitted into a middle piston groove 20 and a lower O-ring 21 fitted into a lower piston groove 22. The piston grooves 18, 20 and 22 are annular grooves extending about the circumference of the piston 15 and are sized in combination with the O-rings 17, 19 and 21 so that the O-rings snugly seal against and wipe the chamber internal walls 7. The piston preferably has a domed upper surface 24 which substantially accords with the shape of the domes interior of the chamber upper end 3 and provides an extensive area for surface resilience when under the occurence of an extreme pressure shock surge.

In the illustrated example, the piston 15 also includes a hollow interior 25 open to the bottom. The hollow interior 25 provides a receptacle for the collection of sediment, such as fine sand or precipitated calcium carbonate, when the arrester 1 is used in an inverted, or upside down position. The inverted position is often used in plumbing layouts and the instant piston 15 provides a particular advantage when used in this orientation.

Preferably, the O-rings 17, 19 and 21 are of Buna N synthetic rubber like material. The three O-ring configuration is particularly advantageous, for the upper O-ring 17 and lower O-ring 21 first encounter any abrasive elements adhering to the internal cylindrical wall 7 during respective upward or downward movement. The middle O-ring 19 provides a back-up seal should there be any leakage past the O-rings 17 and 21, as occasioned by abrasion from fine sand or precipitated calcium carbonate.

The lightweight of the preferred material of the piston contributes greatly to long life of the water hammer arrester 1, particularly through decreased wear to the O-rings 17, 19 and 21. Relative to a convention solid brass piston, the use of a lightweight Delrin piston 15 prevents excessive wear to the O-rings and to the interior bottom of the lower end 4 of the chamber 2. The conventional solid brass piston has a high moment of inertia because of its greater weight and can impact or "slap" against the bottom of the chamber, causing internal damage and noise. The lighter-weight Delrin piston does not display this tendancy and thereby alleviates internal wall damage and the clicking noise, both contributing to longer product life.

Additionally, the spun closed upper end 3 and the spun reduced orifice lower end 4 apparently act as restrictors for fluid flow and provide a cushioning effect to prevent "slap back" of the piston 15. The reduction apparently tends to progressively increased fluid resistance as the piston 15 moves toward it.

Note that the O-rings 17, 19 and 21 are of a smaller thickness than the respective piston grooves 18, 20 and 22 and therefore tend to roll slightly in the grooves upon initiation of movement of the piston 15. This initial rolling action lessens the frictional resistance which must be overcome upon surges in water pressure and provides a more responsive arrester.

The chamber 2 is separated by the piston 15 into an upper chamber portion 27 and a lower chamber portion 28 wherein the upper chamber portion has a super atmospheric charge of gas, preferably air, at a pressure of approximately sixty psi, although other gases, such as nitrogen or the like inert gas can be used for specialized applications and which is captured therein during the spinning process. The lower chamber portion 28 is open to the water pipe 10 and is filled with water during operation.

During operation, water hammer is induced by the quick shutting off of valves in the water system causes pressure or shock fronts to travel throughout the water system and bounce back from other non-shock absorbing, closed structures within the system. Upon entry of the water hammer shock waves into the water hammer arrester 1, the piston 15 is pushed by the shock of the transitory water pressure from upwardly or toward the upper chamber portion 27, whereupon it is again urged downwardly by the air charge contained therein. One oscillation of the piston 15 may be sufficient to dampen a relatively weak water hammer phenomenon; however, it may take tow or more piston oscillations to dampen the shock affect from a relatively strong or well developed water hammer. The instant water hammer arrester 1 is believed to be capable of extremely long service life, for there are no seams to corrode, no gas charge end fittings to leak, and the spun closed pressurized chamber offers a reduction to cushion and alleviate piston "slap back". The water hammer arrester 1 is manufactured in various sizes and typically, several are needed throughout a water system to reduce the effect of water hammer.

It is to be understood that while certain forms of the present invention have been illustrated and described herein, it is not to be limited to the specific forms or arrangement of parts described and shown.

What is claimed and desired to be secured by Letters Patent is as follows:

1. A water hammer arrester comprising:
 (a) an elongate one piece cylindrical chamber having an upper spun closed conical end and a lower end spun to a neck of reduced diameter, said neck including means for connection to a water pipe;
 (b) a lightweight, domed piston matching said upper end and of water and gas impervious synthetic resinous material emplaced in said chamber and moveable up and down therein in response to water pressure, said piston dividing said chamber into a sealed upper chamber portion and a lower chamber portion communicating with said water pipe;
 (c) said upper chamber portion having a super atmospheric charge of gas;
 (d) said piston having upper, middle and lower annular grooves therearound; and
 (e) O-ring seals of lesser thickness than said grooves and mounted in said grooves and maintaining substantially leak free separation of said upper and lower chamber portions, said O-ring seals tending to provide a rolling action upon initial movement of said piston.

* * * * *